June 12, 1934.  C. TURGEON  1,963,037
CIRCUIT CLOSING DEVICE FOR STEERING WHEELS
Filed April 2, 1931  3 Sheets-Sheet 1

Inventor:
C. Turgeon
by
Atty

June 12, 1934.  C. TURGEON  1,963,037
CIRCUIT CLOSING DEVICE FOR STEERING WHEELS
Filed April 2, 1931  3 Sheets-Sheet 2

Inventor:
Charles Turgeon,
by C. F. Wenderoth
Att'y.

Patented June 12, 1934

1,963,037

UNITED STATES PATENT OFFICE 1,963,037

CIRCUIT CLOSING DEVICE FOR STEERING WHEELS

Charles Turgeon, Rennes, France

Application April 2, 1931, Serial No. 527,248
In France April 15, 1930

16 Claims. (Cl. 200—59)

My invention has for its object to provide a circuit closing device for steering wheels adapted to allow the driver to close the circuit of the one or several electric warning aparatus by pressing with one finger on any point of the rim of the steering wheel, without his ceasing to grasp said steering wheel with both hands.

According to my invention, said steering wheel comprises two elements, having the shape of a ring, or of portions of a ring, placed adjacent each other in a housing provided in the rim of the steering wheel in such manner that any pressure exerted by a finger, on any given point of the rim, will apply one element against the other one and will accordingly set up the signalling current.

The movable element may, according to my invention, consist of a coil spring under tension, which tends to place itself in the part of the housing located in the rim that corresponds to its smallest circumferential length. When, under the action of a finger, this element is pressed upon, it is moved towards the inner part of housing, and comes into contact with the fixed element.

The movable element is placed slightly back in its housing in such a manner that the rounded protruding edges of said housing protect said movable element from any accidental contact, and thus prevent it from being operated by mistake although they are not in the way of the driver's hand which is quite free to operate the steering wheel.

Figure 1:
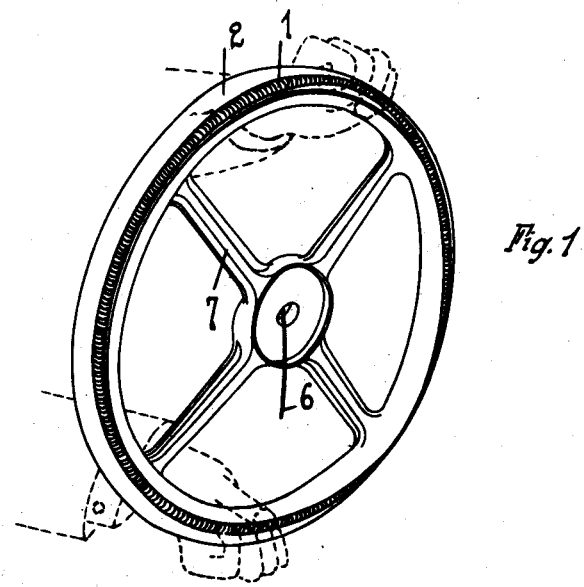
Figure 2:
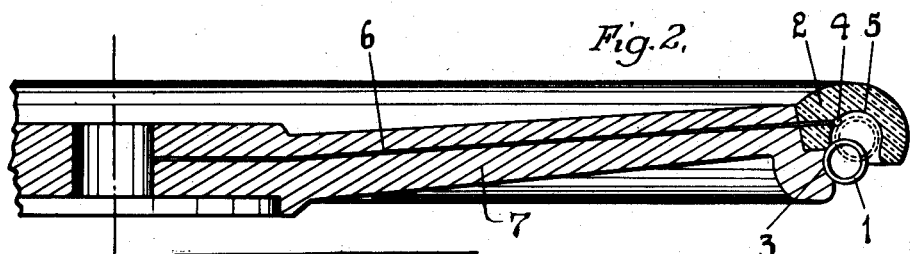

A preferred embodiment of my invention will be hereinafter described with reference to the appended drawings given merely by way of example and in which Fig. 1 is a perspective view and Figure 2 is an axial section of a driving wheel according to my invention.

Figure 3:
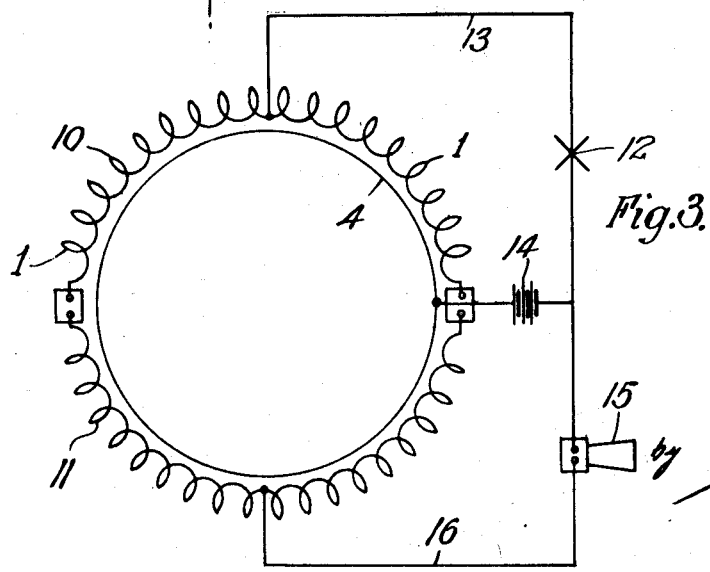
Figure 4:
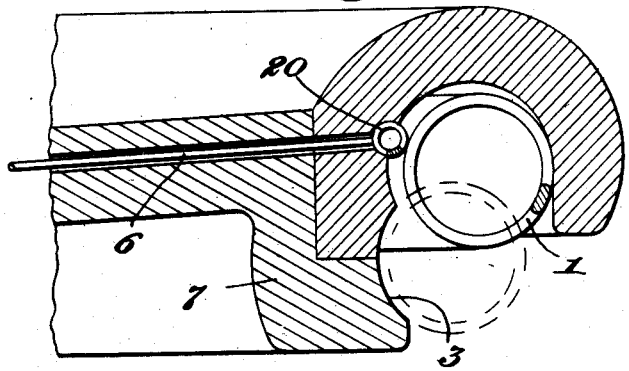
Figure 5:
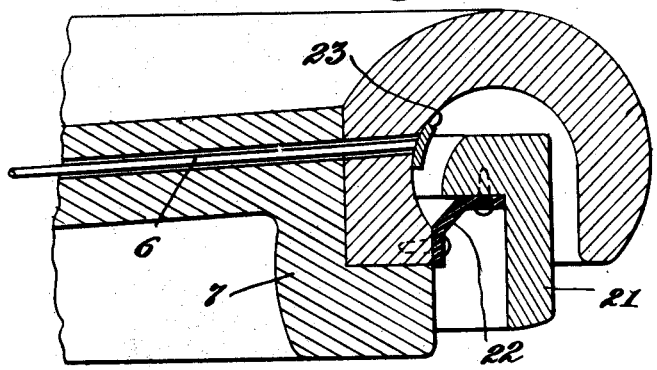
Figure 6:
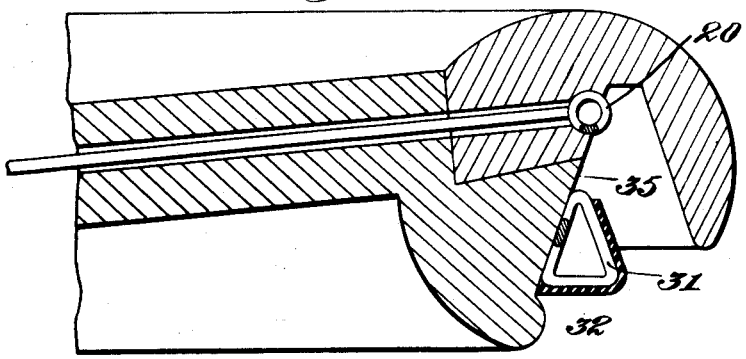
Figure 7:
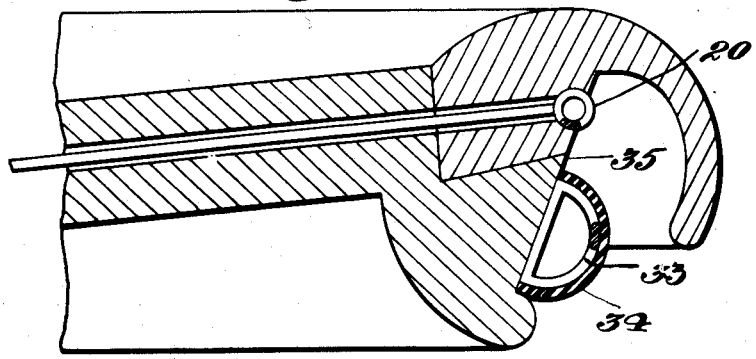
Figure 8:
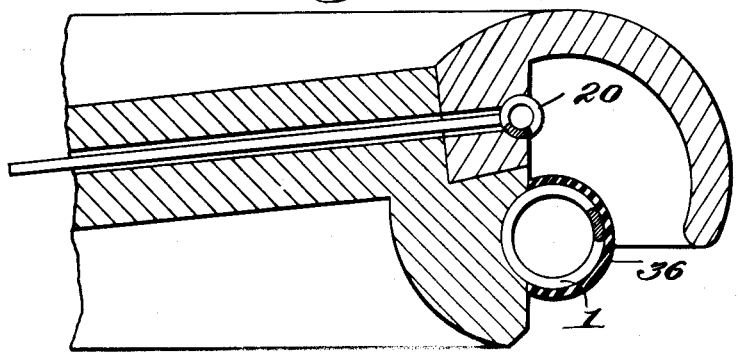

Figure 3 is a diagrammatic view showing two segments of the movable contact,

Figure 4 is a partial sectional view showing the fixed contact form of a coiled resilient wire, Figure 5 is a partial sectional view of a form of the invention in which a solid ring having an elastic connection with the rim is provided, Figure 6 is a partial sectional view of another form of the invention in which the movable contact is made in the form of a spring having spiral triangular coils, Figure 7 is a partial sectional view similar to Figure 6 but in which the movable contact is formed by a spring having a semi-circular form, and Figure 8 is another partial sectional view in which the movable contact is formed by a circular spring having a partial insulation coating.

The first elastic metallic element consists of an extensible spring 1, submitted to a certain tension and having any given section. Said element is retained and guided round rim 2 of the steering wheel, by a furrow 3, or by any suitable securing means, which holds it in place in the form of a rounded annular projection continually within reach of the driver's fingers.

Said spring, under tension, which constitutes the outer extensible element, may be of any given size or shape, provided that it yields under the pressure of a finger and that the metal of which it is made, preferably light (duralumin, for example), is conducting.

A slight flexion impressed on said element, a gentle pressure of the finger on any point of the rim, suffices to establish the contact with a second metallic element 4, juxtaposed, which is fixed parallelly to the inner wall 5 of the groove.

The electric contact ceases to exist as soon as the pressure of the finger is removed, and left to itself, elastic element 1, again free, takes, while contracting, its place in furrow 3, from which the finger had displaced it, and it remains there owing to its own elasticity, which makes easy its taking to pieces and replacing in position.

The fixed element 4 may consist wholly or in part, of a twisted metallic wire which forms a spring, which owing to its elasticity can adapt itself to the rim, be fixed there and even be easily taken to pieces, especially if its connection with conducting wire 6 is ensured by mere contact.

Said element may also consist of a simple or cabled string, of a band or ribbon, or any other metallic belt, of various possible section, fixed in any suitable manner.

Said fixed element may even be replaced by the upper part of the rim, provided that said part is metallic and insulated.

Wherever the hand of the driver may be on the rim, he can at will, by merely moving one finger, bring into contact the two elements so as to operate the warning apparatus, without removing his hands from the steering wheel, or being in any way hampered during his driving operations. This device makes it possible for him to have always simultaneously under his finger and in both hands the controlling organ of the warning apparatus, and the rim of the steering wheel respectively, which thus ensures at the same time instantaneous warning and the continuity of whatever driving operation the driver may be engaged in to the great advantage and safety of both the public and the car.

In order to better protect the flexible element against damp and dust, and to insulate it from the hands of the driver, the spring of which it consists may be covered over, on its outer part, with an insulating protection (layer of varnish or of paint, rubber ribbon or any suitable covering of any given thickness) which without impeding the elasticity of the spring, may improve the hold of the driver's fingers, on condition that the part which is to come into electric contact with the adjoining element, is left uncovered.

An outer movable element, a flexible metallic covering or a second spring which would surround and cover up concentrically said first mentioned spring, might obviously be used in accordance with my invention.

Provided that, when at rest, the two elements are sufficiently spaced apart and insulated from each other to ensure that no current is flowing, the rim of the steering wheel may be, wholly or in part, made of wood, metal, or any other material.

Said rim is supported by the arms of the steering wheel 7, which may be rigid or flexible, whatever their number, shape, arrangement, and mode of assembling may be.

If it is desired to protect, hide or conceal the conducting wires, it is only necessary to make the branches hollow or tubular.

It is also easy, even for flexible steering wheels to protect or conceal the insulated conducting wires. It is only necessary, for example, to place these wires within the members which often surround the arms of flexible steering wheels, or else to give them the flattened shape of a thin metallic insulated ribbon, which makes it possible to apply it closer against the blades of the arms of the flexible steering wheels. When said arms are slidably arranged and relatively independent of the rim, the use of this metallic ribbon in connection with the rim to replace the wire or to support it and guide it, is particularly advantageous.

For the control of a single warning apparatus it is not necessary to have two wires in electric connection with the two elements: a single insulated wire, connected preferably to the inner fixed element will suffice to ensure the flow of current, by using together with the metallic mass of the frame, the metallic mass of the arms of the steering wheel which are in contact, through the rim, with the outer movable element.

In a general way, the electric connection of each element, either through an insulated wire, or through the mass, may (according to which of these means is employed) be obtained in different ways without departing from the spirit of my invention.

The device, which is the object of my invention has many advantages: it is simple and strong. The organs which are few in number, and consequently are not much in the way, namely; the rim and its two circular elements are easy to get at, which makes it possible to easily control them, keep them up and repair them, at any time. They can easily be taken to pieces, and can be rapidly set back in position, without the use of tools, the spring establishing itself in its place owing to its own elasticity, without requiring any accessory organ of fixation.

To conceal the device, it is necessary merely to lodge it under the rim of the steering wheel, in the groove which protects it.

The arms of the flexible steering wheels are left free; they are neither encumbered nor made heavier by the adjunction of any accessory, and therefore keep their entire flexibility. The central part of the rigid or flexible steering wheels can easily be used for any other object.

Should the rim incur any deformation during its use, the flexibility of the whole device which, without play or seizing, follows very exactly the contour of the rim, would prevent the working of the warning apparatus from being impeded.

The operation of the apparatus is the better ensured as the electric current is set up between the two elements on a greater surface, and it is impossible that this contact should be established without the will of the driver. The apparatus is sheltered in a groove whose rounded edges project on either side of it so that it can not be actuated by the sliding motion of the palm of the hand, which is necessary along all the rim of the steering wheel for driving the car.

And even if the elastic element were touched by the palm of the hand, that would not result in bringing it into contact with the inner rigid element, but rather in pushing it back into the furrow where it is lodged. It is only by a voluntary pressure of a finger (of the forefinger, preferably) that the two elements can be brought together, put into contact and, consequently operate the warning apparatus. And as the elastic element is being brought nearer the fixed element under the action of the finger in order to set up the current, said elastic element in leaving the furrow in which it is lodged presents an increasing surface to the finger.

In this way, the driver has continually under his hands the control of the warning apparatus whatever be the points of the steering wheel on which his hands are placed. And for actuating said warning apparatus, the deflection which he must impart to the spring only requires a gentle pressure of the forefinger, owing to the flexibility of said spring which is due to its length and to the possible variation of its degree of tension (by means of a connecting piece, for example).

Whatever the position of the two hands on the rim of the steering wheel may be, it is not necessary that one of them should leave the steering wheel in order to actuate the warning apparatus. This simplification makes it possible to simultaneously operate the warning apparatus and steer the car.

This simultaneous operation does not prevent the use of two different warning apparatus, one for the town, for example, the other for the country, with or without a reversing organ which could easily be placed in the center of the steering wheel. To do away with the reversing organ, it would be necessary merely to divide the circular element into two parts independent one from the other. Each segment placed under each hand controls separately the special warning apparatus to which it is connected.

Apart from these applications, this device may be used for any other purposes, for example to indicate, by the lighting of one or the other of two electric lamps, in which direction, left or right, the driver intends to turn his car.

Similar results may be obtained by substituting for the extensible spring which forms the outer movable element, a thin circular metallic band fixed on one side onto the rim which shelters it, and the other edge of which is left free and flexible enough to be bent by the slight pressure of a finger.

Said circular band may be cut out, sectioned or divided in various ways; it may also be covered, like the aforedescribed spring, by an insulating layer or protective cover without departing from the spirit of my invention.

Lastly, the extensible spring or the flexible band which forms the outer element may both be replaced by a rigid circle, or a portion of a rigid circle, having an elastic base, located and held in the rim, and which, by yielding under the finger at any point of its circumference, and coming into contact, as in the preceding case, with the adjoining inner element, thereby causes the operation of the electric warning apparatus.

Figure 3 shows diagrammatically a flexible ring contact 1 which is divided into two segments 10 and 11. The wiring circuit for the lights 12 is shown at 13 and the battery or other source of electrical current at 14. The wiring circuit for the horn 15 is shown at 16. It is believed that the operation of the contact closer is clear from the above description. It is of course obvious that the flexible ring 1 may be divided into as many segments as desired.

In Figure 4 there is shown the form of invention in which the fixed contact 4 consists of a coiled wire 20. The fixed contact 20 cooperates with the resilient ring 1 in the same manner as the modification above described shown in Figure 2. The normal position of the flexible contact 1 is shown in dotted lines in Figure 4 and the position occupied by the flexible ring when raised by the fingers is shown in full lines.

A further modification is shown in Figure 5 in which there is provided a circular ring 21 which is connected to the rim by an elastic or flexible element such as the rubber member 22. In the modification shown in Figure 5 the fixed contact consists of a flat ribbon 23. The operation of the modification is believed to be obvious. Upon movement of the fixed circular ring 21 by the fingers, contact is made between the ring and the fixed contact 23. Upon release of the pressure of the fingers the fixed ring will drop into the position shown in the drawings.

In Figures 6, 7 and 8 three different modifications are shown of the movable contact spring.

In Figure 6 the contact spring 31 is of spiral form and has a triangular shape. The contact spring 31 has a coating of rubber or other material 32 extending partially around the same so as to protect that portion against which the fingers come into contact. The spring 31 of course makes contact with the fixed spring contact 20 which is similar to the contact shown in Figure 4.

In Figure 7 the movable contact 33 is of spiral form and has a semi-circular shape. The spring 33 is covered partially by the coating 34 where the fingers come into contact with the same. In both Figures 6 and 7 the movable contact slides along a slope 35.

In Figure 8 we have a movable contact spring 1 which is partially covered by a coating 36 of rubber or other material. It is believed that the operation of the forms of the invention shown in Figures 6, 7 and 8 is obvious.

While I have disclosed what I deem to be the preferred form of my device, I do not wish to be limited thereto as there might be changes made in the construction, disposition and form of the parts, without departing from the spirit of my invention as comprehended within the scope of the appended claims.

What I claim is:

1. A motor car steering wheel comprising a rim provided with a relatively deep circumferential groove and a shallow circumferential furrow adjoining said groove, a fixed insulated conducting element at the bottom of said groove, a resilient insulated conducting element disposed in said furrow, whereby said resilient element can be moved into contact with the fixed element so as to close an electric control circuit and means whereby the resilience of said resilient element acts to hold said elements normally separated.

2. A motor car steering wheel comprising in combination a rim provided with a circumferential groove in the under side of its outer part and a circumferential furrow adjacent said groove, an insulated conducting element at the bottom of said groove, a resilient insulated conducting element disposed in said furrow, whereby said resilient element can be moved into contact with the first named element so as to close an electric circuit of a warning apparatus and means whereby the resilience of said resilient element acts to hold said elements normally separated.

3. A motor car steering wheel comprising in combination a rim provided with a relatively deep circumferential groove in the under side of its outer part and a shallow circumferential rounded furrow adjoining the inner edge of said groove, a fixed insulated conducting element at the bottom of said groove and an insulated metallic coil spring placed in said furrow so as to be maintained therein by its own tension, whereby said coil spring can be moved into contact with the fixed element so as to close the electric circuit of a warning apparatus.

4. A motor car steering wheel comprising in combination a hub, an inner rim, integral with said hub, and provided with a circumferential shallow rounded furrow along its outer wall, an outer rim having in section the shape of an inverted V mounted on said inner rim, an insulated conducting element mounted inside said outer rim, a coil-shaped insulated conducting elastic member movably disposed in said furrow whereby said elastic element can be easily forced into contact with the fixed conducting element and thus close the circuit controlling a warning apparatus and means whereby the resilience of said resilient element acts to hold said elements normally separated.

5. A motor car steering wheel comprising in combination a hub, an inner rim, integral with said hub and provided with a circumferential shallow rounded furrow along its outer wall, an outer rim having in section the shape of an inverted V mounted on said inner rim, a fixed insulated conducting element mounted inside said outer rim and an insulated metallic coil spring placed in said furrow so as to be maintained therein merely by its own tension whereby said elastic element can be easily forced into the outer rim so as to come into contact with the fixed conducting element and thus close the circuit controlling a warning apparatus.

6. A motor car steering wheel comprising in combination a rim provided with a relatively deep circumferential groove and a shallow circumferential furrow adjoining said groove, an insulated conducting element in said groove and a plurality of resilient insulated conducting elements disposed in said furrow, whereby any one of said resilient elements can be moved into contact with the first named element so as to close the electric circuit of a corresponding warning apparatus.

7. A motor car steering wheel comprising in combination a rim provided with a relatively deep circumferential groove, a fixed insulated conducting element disposed at the bottom of said groove, a resilient circumferential insulated conducting element disposed adjacent said groove, whereby said last named element can be moved into contact with the fixed element so as to close the electric circuit of a warning apparatus and means whereby the resilience of said resilient element acts to hold said elements normally separated.

8. A motor car steering wheel according to claim 7 in which the resilient element comprises a rigid circle and elastic means for connecting it to the rim.

9. A motor car steering wheel according to claim 7 in which the fixed conducting element comprises a metallic twisted wire forming a spring.

10. In a device of the class described, in combination, a steering wheel rim formed with a concentric annular groove, contact material fixed in said groove and extending continuously thereabout, a resilient contact in said groove extending continuously thereabout adapted to be pressed into contact with the first named contact at any point in their circumferential extent and means whereby the resilience of the last named contact acts to hold the contacts normally separated.

11. In a device of the class described, in combination, a steering wheel rim formed with a concentric annular groove, a portion of said rim of metal adapted to be grounded on the steering column, a contact surface of conducting material extending continuously about the groove and exposed therein, a resilient contact member mounted in said groove adapted to be pressed into contact with said material at any circumferential point, means whereby the resilience of said member acts to hold the same out of contact with said surface, one of said contacts grounded to the metal of the rim and an insulated conductor connected to the remaining contact.

12. In a device of the class described, in combination, a steering wheel rim formed with a concentric annular groove, a portion of the inner circumferential wall of said groove sloping from its bottom toward the central axis of the rim, a stationary electrical conductor extending continuously in said groove, a contractile endless band conductor in said groove normally spaced from said first named conductor by riding upwardly on said sloping surface, contact between said conductors at any point about the rim adapted to close an electrical circuit.

13. In a device of the class described, in combination, a steering wheel rim formed with a concentric annular groove, a portion of the inner circumferential wall of the groove sloping from its bottom toward the central axis of the rim, a portion of said rim of metal adapted to be grounded on a steering column, an exposed surface of contact material extending continuously in said groove and forming one contact element, a second contact element formed as an endless band of helically coiled resilient conducting material normally of less diameter than that of the groove, stretched in said groove and by its contractility riding upwardly on said sloping wall out of contact with said first named contact element, one of said contacts grounded to the metal portion of said rim and an insulated conductor connected to the other thereof.

14. In a device of the class described, in combination, a metallic steering wheel rim formed with a concentric annular groove having a substantially vertical inner wall provided with a continuous recess above its bottom and metallic spokes conductively engaging and supporting said rim and adapted to be grounded on a steering column, a ring of insulating material in the bottom of said groove, a substantially continuous ring of conducting material mounted on and projecting above the surface of said insulating material out of contact with the metal of said rim, an insulated conductor connected to said conducting ring, a contractile endless band of helically formed resilient wire of less normal diameter than that of said groove stretched into said groove and held in said recess by its contractility, out of normal contact with said conductive ring and adapted to be pressed out of said recess into contact with said conductive ring at any point in the circumference of the rim.

15. In a device of the class described, in combination, a steering wheel rim formed with an annular groove, contact material in said groove and extending continuously thereabout, a resilient contact in said groove extending continuously thereabout adapted to be pressed into contact with the first-named contact at any point in their circumferential extent and means whereby the resilience of the last named contact acts to hold the contacts normally separated.

16. In a device of the class described in combination a steering wheel rim formed with a concentric annular groove, contact material fixed in said groove and extending continuously thereabout, a resilient contact in said groove extending continuously thereabout adapted to be pressed into contact with the first named contact at any point in their circumferential extent, means whereby the resilience of the last named contact acts to hold the contacts normally separate and a flexible material placed upon said resilient contact for preventing contact with the resilient contact by the operator's hand.

CHARLES TURGEON.